United States Patent [19]

Arnold et al.

[11] Patent Number: 5,170,391
[45] Date of Patent: Dec. 8, 1992

[54] FAULT DETECTION AND BANDWIDTH MONITORING MEANS FOR A PACKET SWITCHING ARRANGEMENT

[75] Inventors: John S. Arnold, Nether Heyford; Alexander S. Philip, Wimborne, both of United Kingdom

[73] Assignee: GEC Plessey Telecommunications Limited, England

[21] Appl. No.: 595,193

[22] Filed: Oct. 10, 1990

[30] Foreign Application Priority Data

Oct. 13, 1989 [GB] United Kingdom ............... 8923158

[51] Int. Cl.[5] .............................................. H04J 1/16
[52] U.S. Cl. ...................................... 370/13; 371/71; 370/15
[58] Field of Search ................ 370/13, 60, 60.1, 15, 370/94.1, 94.3; 371/5.1, 5.5, 25.1, 71; 340/825.06

[56] References Cited

U.S. PATENT DOCUMENTS

| | | | |
|---|---|---|---|
| 3,760,115 | 9/1973 | Duerdoth et al. | 370/13 |
| 4,259,663 | 3/1981 | Gable | 371/71 |
| 4,965,788 | 10/1990 | Newman | 370/60 |
| 4,993,013 | 2/1991 | Shinada et al. | 371/71 |

FOREIGN PATENT DOCUMENTS 0272513  6/1988  European Pat. Off. .

Primary Examiner—Douglas W. Olms
Assistant Examiner—Shick Hom
Attorney, Agent, or Firm—Kirschstein, Ottinger, Israel & Schiffmiller

[57] ABSTRACT

The fault detection and bandwidth monitoring arrangement provides a counter in association with each virtual circuit crosspoint. The counters may be provided with a common or individual threshold value which when exceeded causes alarm signals to be generated. The counter arrangement is arranged to record the averaged imbalance of receive and transmit data at each switch port involved in the virtual circuit connection, and additionally is arranged to measure the difference between the net data flows of the corresponding incoming and outgoing ports. Therefore, it is possible to distinguish between the go/return traffic imbalance and an information loss situation in the switch.

3 Claims, 2 Drawing Sheets

FAULT DETECTION AND BANDWIDTH MONITORING MEANS FOR A PACKET SWITCHING ARRANGEMENT

BACKGROUND OF THE INVENTION

1. Field of the Invention

The present invention relates to a fault detection and bandwidth monitoring means for a packet switching arrangement, such as an asynchronous time division multiplex ATDM switch between boards in a system.

2. Description of Related Art

Fault detection in a pure, asynchronous ATDM switch where replicated switch planes may not be provided or, if provided, are not synchronous with each other, will be based on error correlation techniques rather than direct plane comparison.

Traffic management in such a switch involves bandwidth monitoring to determine the actual degree of utilization of links as opposed to planned or negotiated utilization. In this context planned utilization relates to the connection set-up phase of switching where a switch path is selected according to an estimate of switch link loading based on data rates and on the statistical nature of the connections. Negotiated utilization relates to the class of service of the customer who may be charged according to quality of service criteria.

Deviations from the planned occupancy are to be expected as new connections are established during holding times of existing ones in a manner which cannot be accurately predicted. Moreover, failure conditions can cause redistribution of traffic due to re-routing around faults, including self-healing techniques.

Deviations from planned occupancy can be reduced if the switch is fully conscious of its connection types in terms of peak-to-mean bandwidth and streamed or bursty source.

Similarly deviations from negotiated occupancy can occur due to fradulent usage or to malfunction.

SUMMARY OF THE INVENTION

Objects of the Invention

An aim of the present invention is to provide a fault detection and bandwidth monitoring means which overcomes the above mentioned problems in an efficient manner.

A further aim of the present invention is to provide one logical entity to perform two quite different roles of fault detection and traffic monitoring. The logical entity is a counter arrangement in which different presettable thresholds initiate alarms and fault recovery, and cause re-routing, within the switch or externally to the switch, or can even force a disconnect state.

Features of The Invention

According to the present invention there is provided a fault detection and bandwidth monitoring arrangement for use in a packet switching arrangement having a plurality of input ports and a plurality of output ports, said input and output ports being arranged to be interconnected by a plurality of switching elements each comprising a number of virtual circuit (VC) switching crosspoints, characterized in that each virtual circuit has an associated counter arrangement arranged to measure the difference between the net data flows at the corresponding incoming and outgoing ports and have presettable thresholds which cause alarm signals to be generated when the thresholds are exceeded.

BRIEF DESCRIPTION OF THE DRAWINGS

An embodiment of the present invention will now be described with reference to the accompanying drawings wherein.

DETAILED DESCRIPTION OF THE PREFERRED EMBODIMENT

Figure 1:
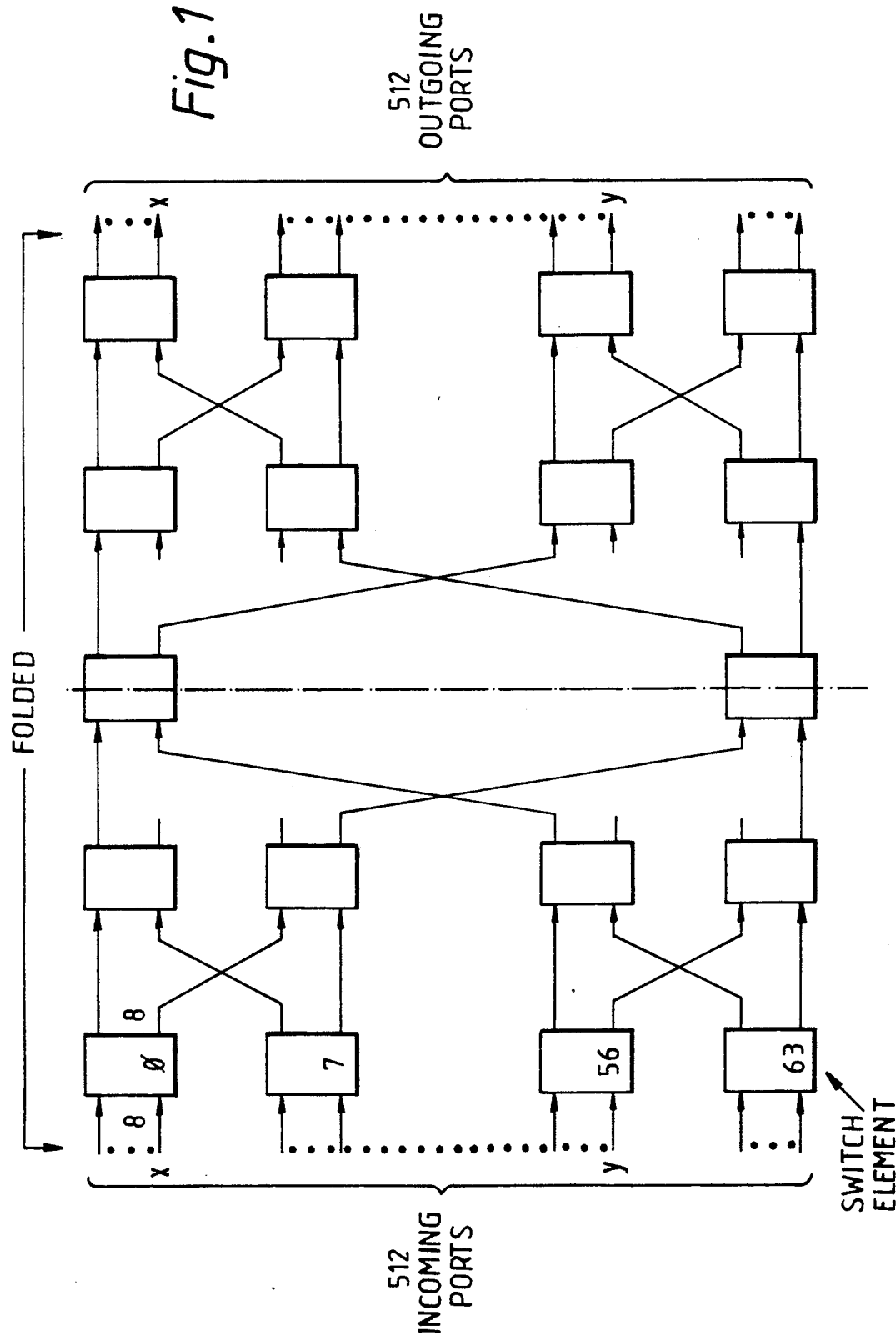
FIG. 1 shows a typical configuration of a 512 port switch, and, FIG. 2 shows an example of a counter arrangement located at an outer switch port comprising an input port and the corresponding output port of FIG. 1 for traffic in one direction of transmission.

Referring to FIG. 1 a typical configuration for a 512 port switch arrangement is shown. The arrangement comprises a number of switch elements such as 0-63 each element comprising eight inputs. Each element contains queues which are used to smooth the data flow onto the output ports. The elements are interconnected such that any input port can be connected to any output port. The configuration is shown to be in folded form whereby the input ports lie on the same side as the output ports.

The various counter elements which form the basis of the present invention are provided for each virtual circuit at the switch input or output sides of the external ports to the switch structure, for example of a port comprising the top left incoming port and top right outgoing port of FIG. 1. The registers are arranged to record the average difference between the quantity of data sent to the switch on a virtual circuit and that received from the switch at the opposite end of the path through the switch. In order to do this, means must be provided to communicate the quantity of data received at the port receiving the data to the port sending the data. Each port is both a receiver and sender of data to the switch and therefore symmetrical information paths internal to the switch structure must be provided for each direction of transmission for each virtual circuit. Since the purpose of the switch is to provide reciprocal data communication paths for virtual circuits between ports of the switch it is desirable that the same communications means be used for the secondary purpose of communicating information on the quantity of data transmitted across the switch in each virtual circuit.

All the virtual circuits are assumed to be both way in the switch even if in fact a virtual circuit is unidirectional. The same label value is used for the two directions of transmission. As mentioned previously, the switch is in fact folded and single sided thus each direction of a virtual circuit is a separate path through the switch, that is to say from port X to port Y, and from port Y to port X as is the case in a typical System X type switch.

Each packet header holds an additional field which gives a number of packets received on the virtual circuit since the last one was transmitted. The value of this field comes from the counter arrangement in respect of each virtual circuit which indicates the number of packets received. The field size and count can be in the order of five bits for up to thirty one packets received. It will be noted that the count permits a large discrepancy in rates for the two directions of transmission. To cater for unidirectional virtual circuits, a packet is generated by a digital line termination unit if the count accumulates to the field size. At the receiving end the value of this count is subtracted from account of packets sent. This needs to be larger than the field size, say seven bits. An accumulation of this count above a preset value would result in an alarm indication being triggered. The preset value could be held in the virtual circuit translator memory and could therefore be different for each virtual circuit, allowing for minimization of fault detection time dependent on the expected ratio of packet rates for the two directions.

Figure 2:
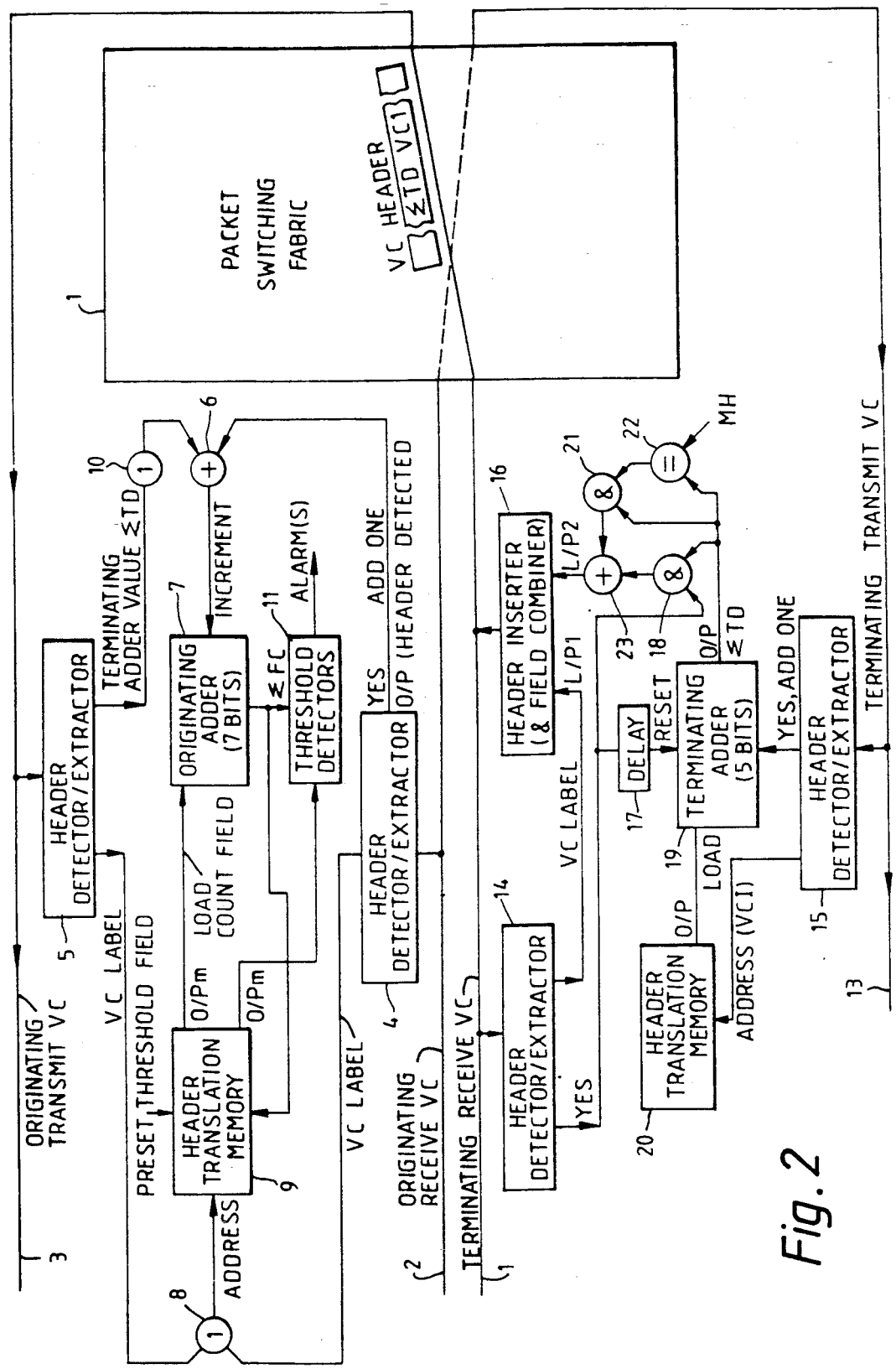

Referring to FIG. 2 only those header translator output occurrences are shown which are relevant to the fault detection counters. Other basic operational header translations are omitted for clarity. The drawing shows circuitry for the traffic direction X receive-to Y transmit only. Additional, identical arrangements would be provided for checking the direction Y receive-to X transmit. The counter arrangement is shown connected through a packet switching fabric 1 such as that shown in FIG. 1 of the accompanying drawings.

Considering firstly the originating receive virtual circuit and the originating transmit virtual circuit side of the arrangement, each packet of data passed along the wires 2 and 3, have header information detected and extracted by circuits 4 and 5, respectively. If a header is detected, an output is generated from circuit 4 which is passed to a combiner 6 to increment the originating adder circuit 7. The circuit 4 extracts the virtual circuit label and passes it to a combiner 8 so that it may form part of the address for the header translation memory circuit 9. Similarly, the circuit 5 extracts the terminating adder value $\Sigma_{TD}$, which is passed via an inverter circuit 10 to the combiner 6 in order to increment the originating adder circuit 7. The virtual circuit label is also extracted by circuit 5 and presented to the combiner 8 in order to address the header translation memory circuit 9. The header translation memory circuit 9 is also presented by present threshold fields, and generates two output signals output n and output m. The output n represents the load count field and is used to control the originating adder circuit 7, which comprises seven bits of data. The output of the originating adder circuit 7, $\Sigma_{FC}$ is passed to the threshold detectors 11. This output is also passed to the header translation memory circuit 9, in order to maintain a continuous record of the current value of the summation $\Sigma_{FC}$, which represents the apparent number of cells in the switch. The output from the header translation memory circuit 9 is also passed to the threshold detector circuits 11 which are caused to generate an alarm signal when the originating adder circuit 7 and header translation memory circuit 9 determine a fault condition.

Considering now the terminating receive virtual circuit and the terminating transmit virtual circuit side of the arrangement, packets of data transmitted along lines 12 and 13 each have their header information detected and extracted by circuits 14 and 15, respectively. The circuit 14 generates two output signals, one represents the VC label which is immediately passed to a header inserter circuit 16, which causes the header to be reinserted in the packet of data on line 12. The other signal indicates positively that a header was detected and is passed to a delay circuit 17 providing a fixed delay and an AND-gate 18. The output of the delay circuit 17 is caused to reset a terminating adder circuit 19. The terminating adder circuit 19 comprises five-bits of data. The header detector and extractor circuit 15 generates two output signals, the first signal represents a positive identification of the header and is passed to the terminating adder circuit 19 in order to increment its count by one. The second signal generated from circuit 15 represents the address of the virtual circuit, and is used to address a header translation memory 20, the output signal of which is used to load the terminating adder circuit 19. The output of circuit 19 $\Sigma_{TD}$, is passed to a further input of the AND-gate 18 and to an input of AND-gate 21. The output is also passed to a gate 22 which has a second input permanently connected to a stream of logical one input signals, and the output of gate 22 is connected to a further input of AND-gate 21. The outputs of AND-gates 18 and 21 are applied to respective inputs of a combiner 23, the output of which is used as a further input signal to the header inserter circuit 16. The circuit 16 is under the control of the output of the combiner 23 and the virtual circuit label signal received from circuit 14. Circuit 16 operates to cause the header and field to be combined in the packet of data on line 12.

The field $\Sigma_{TD}$ contains the value of the terminating adder as read at the time of receipt of a packet of data from the respective line, for example, $\Sigma_{TD}$ is the difference of the packets received on the terminating virtual circuit since the last packet was transmitted. It will be appreciated that for unidirectional path transmission only, $\Sigma_{TD}$ will be sent in the terminating-to the originating direction only when its value reaches a maximum count of thirty one.

Additionally, adjustable thresholds can be arranged on the counters to initiate various operations, as follows:

Security plane (or block) changeovers,
Persistence Checks,
Switchpath reselection,
Reconfiguration
Network rerouting, and,
Traffic rejection.

Additionally, correlation techniques applied to counter outputs can assist fault diagnosis inside the switch and amongst network nodes.

The above described counter technique for fault detection and bandwidth monitoring has the advantage of ease of implementation and does not suffer from the disadvantages of the prior art. It provides a simple and efficient way of providing the supervision necessary for such switching arrangements.

The fault detection arrangement described checks the header translation function more completely than any known alternative, such as one based on plane comparison and all sequence numbers. This is made more effective by the fact that the same virtual circuit is used in both directions of transmission with access to the same header translation memory location to obtain the adder fields.

We claim:

1. A fault detection and bandwidth monitoring arrangement for use in an asynchronous packet switching system having means for queuing the packets, said queuing means having a plurality of input ports and a plurality of output ports, said input and output ports being arranged to be interconnected by a plurality of switching elements, each comprising a number of virtual circuits, said arrangement characterized in that: each virtual circuit has counter means connected thereto and operative for measuring the difference between net data flowing into and out of corresponding input and output ports, said counter means having presettable thresholds and being further operative for generating alarm signals when the thresholds are exceeded.

2. A fault detection and bandwidth monitoring arrangement as claimed in claim 1, wherein the preset threshold for each virtual circuit is held in a virtual circuit translator memory.

3. A fault detection and bandwidth monitoring arrangement as claimed in claim 1, wherein the counter means includes means for recording the averaged imbalance of receiver transmit data at each switch port involved in the virtual circuit.

* * * * *